(12) United States Patent
Takano

(10) Patent No.: US 8,964,317 B2
(45) Date of Patent: Feb. 24, 2015

(54) LENS APPARATUS

(71) Applicant: Canon Kabushiki Kaisha, Tokyo (JP)

(72) Inventor: Kentaro Takano, Tokyo (JP)

(73) Assignee: Canon Kabushiki Kaisha (JP)

( * ) Notice: Subject to any disclaimer, the term of this patent is extended or adjusted under 35 U.S.C. 154(b) by 0 days.

(21) Appl. No.: 13/859,107

(22) Filed: Apr. 9, 2013

(65) Prior Publication Data

US 2013/0271862 A1    Oct. 17, 2013

(30) Foreign Application Priority Data

Apr. 13, 2012   (JP) ................................ 2012-092311

(51) Int. Cl.
   *G02B 7/02*   (2006.01)
   *G02B 7/04*   (2006.01)
(52) U.S. Cl.
   CPC ....................................... *G02B 7/04* (2013.01)
   USPC ........................................................ 359/825
(58) Field of Classification Search
   CPC .......... G02B 7/023; G02B 7/026; G02B 7/04;
                   G02B 7/09; G02B 7/105; G02B 7/282
   USPC ................................................ 359/825, 830
   See application file for complete search history.

(56) References Cited

U.S. PATENT DOCUMENTS

2012/0328276 A1*  12/2012  Toyama et al. ................. 396/85

FOREIGN PATENT DOCUMENTS

| JP | 8-146282 A | 6/1996 |
| JP | 58-19524 S | 4/1998 |
| JP | 2003-005008 A | 1/2003 |
| JP | 2003-066304 A | 3/2003 |
| JP | 2005-128374 A | 5/2005 |

* cited by examiner

*Primary Examiner* — Mahidere Sahle
(74) *Attorney, Agent, or Firm* — Rossi, Kimms & McDowell LLP

(57) ABSTRACT

A lens apparatus includes a movable optical element, a driving ring rotatable about an optical axis and adapted to drive the optical element by its rotation, and an operating ring coupled to the driving ring and adapted to rotate about the optical axis integrally with the driving ring. The operating ring includes a first partial operating ring fixed to the driving ring by a first fixing mechanism that allows adjustment of the fixing position with respect to the rotational direction and a second partial operating ring fixed to the first partial operating ring in such a way as to cover the first fixing mechanism. The second partial operating ring is fixed to the first partial operating ring by a second fixing mechanism that allows adjustment of the fixing position with respect to the rotational direction.

10 Claims, 3 Drawing Sheets

LENS APPARATUS

BACKGROUND OF THE INVENTION

1. Field of the Invention

The present invention relates to a lens apparatus, in particular to a lens apparatus having a scale ring that rotates about the optical axis in conjunction with driving of a movable optical element.

2. Description of the Related Art

In conventional lens apparatuses that are not provided with a mechanism for adjusting the flange back, the correspondence between actual object distances and scale marks on the focus scale ring is achieved by adjusting the position of the focus scale ring (operating ring) relative to an optical element (or a driving ring for driving the optical element). For example, the lens apparatus disclosed in Japanese Patent Application Laid-Open No. 2003-66304 has a plain scale portion having nothing drawn or inscribed thereon so that scale marks can be drawn on it as desired. The lens apparatus disclosed in Japanese Patent Application Laid-Open No. 2005-128374 has a scale ring that can be rotated to a desired position to allow position adjustment relative to an optical element. Moreover, as a method of allowing adjustment of the fastened position of a cylindrical member, it is known to provide on the cylindrical member an elongated hole through which a screw used to fasten the cylindrical member is attached and to fix the cylindrical member with its position relative to an optical element adjusted in the range of the width of the elongated hole.

In the above-mentioned prior arts, although the position of a scale mark can be set as desired, there is a possibility that the scale mark disappears (or is erased) during operation and/or that the operating ring (scale ring) is displaced relative to the optical element (or driving ring for driving the optical element). This is undesirable for shooting. Moreover, in cases where a fixing arrangement (e.g. an elongated hole) that allows adjustment of the fastening position along the scale direction is provided on the operating ring (scale ring), foreign matters such as dust are liable to enter the fixing arrangement (e.g. an elongated hole) that is exposed to the outside. Furthermore, the lens apparatuses disclosed in the above-mentioned prior arts have only one operating ring for one function (e.g. focusing). Therefore, the techniques disclosed in the above-mentioned prior arts cannot be applied to cases where two operating rings (two scales) whose fastened positions can be adjusted relative to each other are to be used for one function.

SUMMARY OF THE INVENTION

In view of the above, the present invention provides a lens apparatus in which the position of an operating ring (scale ring) can be fixed at an adjusted position relative to an optical element in such a way as to prevent the operating ring from moving during operation, a fixing arrangement (e.g. elongated hole) that allows adjustment of the fastening position of the operating ring (scale ring) to adjust the position of a scale line relative to the optical element is not exposed to the outside so as to prevent dust and foreign matters from entering the fixing arrangement (e.g. elongated hole) and not to deteriorate the appearance of the lens apparatus. Further, the present invention provides a lens apparatus that allows to use two operating rings for one function whose fixed positions can be adjusted relative to each other.

A lens apparatus according to the present invention comprises a movable optical element; a driving ring rotatable about an optical axis and adapted to drive the optical element by its rotation; and an operating ring coupled to the driving ring and adapted to rotate about the optical axis integrally with the driving ring, wherein the operating ring includes a first partial operating ring fixed to the driving ring by a first fixing mechanism that allows adjustment of the fixing position with respect to the rotational direction and a second partial operating ring fixed to the first partial operating ring in such a way as to cover the first fixing mechanism, and the second partial operating ring is fixed to the first partial operating ring by a second fixing mechanism that allows adjustment of the fixing position with respect to the rotational direction.

According to the present invention, there can be provided a lens apparatus in which the position of an operating ring (scale ring) can be fixed at an adjusted position relative to an optical element in such a way as to prevent the operating ring from moving during operation, a fixing arrangement (e.g. elongated hole) that allows adjustment of the fastening position of the operating ring (scale ring) to adjust the position of a scale line relative to the optical element is not exposed to the outside so as to prevent dust and foreign matters from entering the fixing arrangement (e.g. elongated hole) and not to deteriorate the appearance of the lens apparatus. Furthermore, there can also be provided a lens apparatus in which two operating rings whose fastening positions can be adjusted relative to each other can be used for one function.

Further features of the present invention will become apparent from the following description of exemplary embodiments with reference to the attached drawings.

DESCRIPTION OF THE EMBODIMENTS

Preferred embodiments of the present invention will now be described in detail in accordance with the accompanying drawings.

(First Embodiment)

Figure 1:
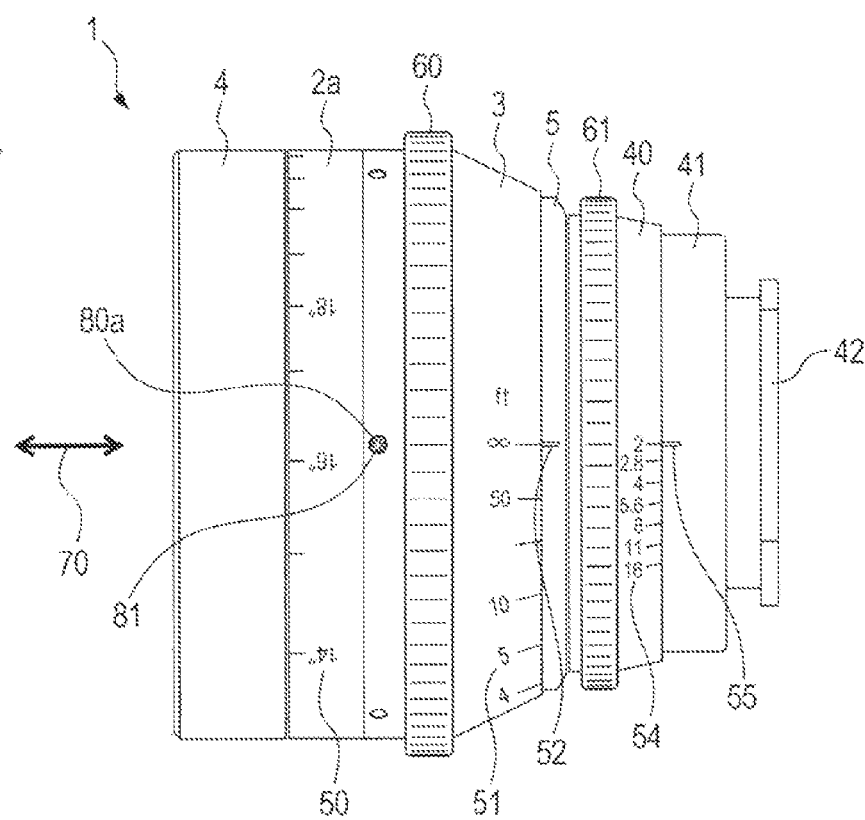
FIG. 1 is an overall view of a lens apparatus according to a first embodiment of the present invention.
Figure 2:
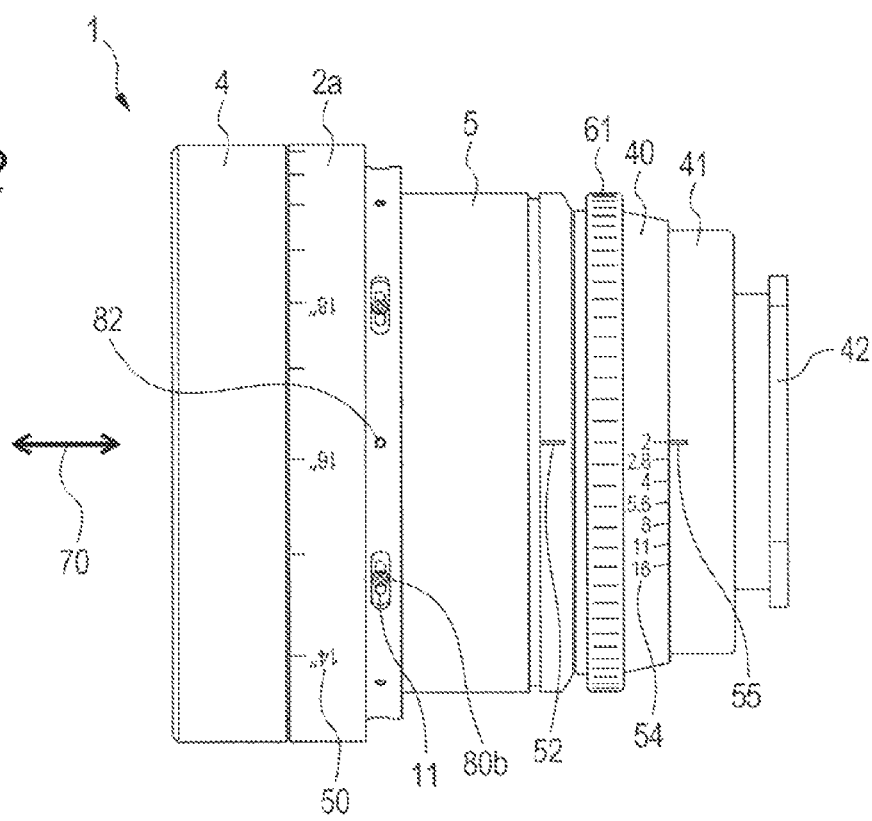
FIG. 2 is an overall view of the lens apparatus according to the first embodiment of the present invention with a rear scale ring removed.
Figure 3:
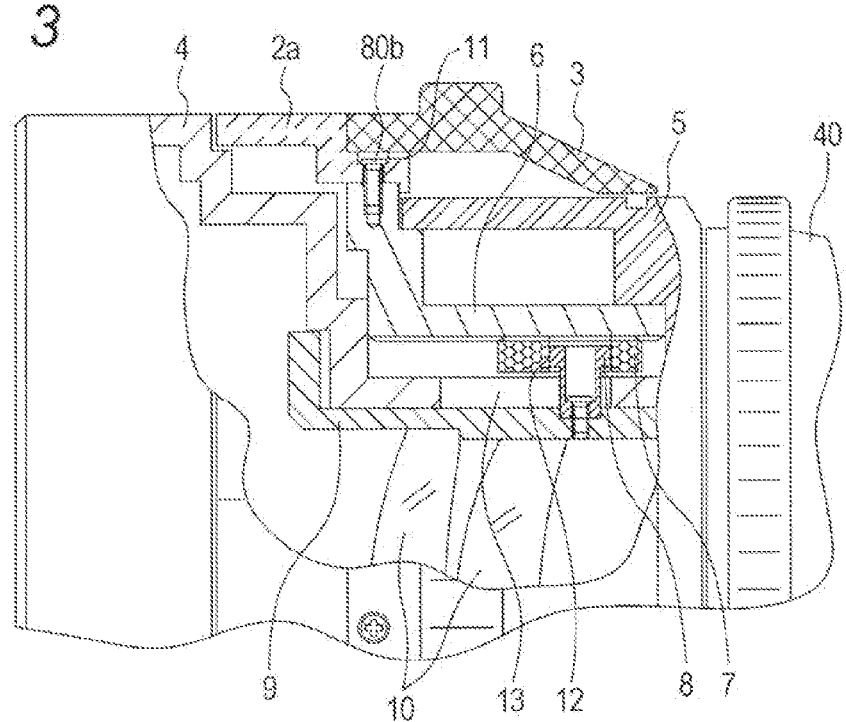
FIG. 3 is a partial cross sectional view of the lens apparatus according to the first embodiment of the present invention.

FIG. 1 is an overall view of a lens apparatus according to the first embodiment. FIG. 2 is an overall view of the lens apparatus, where a rear focus scale ring that will be described later is removed. FIG. 3 is a partial cross sectional view of the lens apparatus.

The basic construction of the lens apparatus will be first described with reference to FIG. 1. The lens body 1 can be coupled to a camera having an image pickup element such as a CCD by a lens mount 42. The lens body 1 has a front focus scale ring (first partial operating ring) 2a that can be turned by user's operation, a rear focus scale ring (second partial operating ring) 3, and an iris scale ring 40. The scale rings respectively have a focus gear 60 and an iris gear 61, which engage with an external rotational operation accessory for changing the rotational angle and rotational direction, or a gear part of an electric accessory having an electric driving mechanism. By turning the iris scale ring 40, the aperture size of the iris mechanism (not shown) provided in the lens body 1 can be adjusted, and the aperture value of the lens body 1 can be changed. A photographer (user) can set a desired aperture value by aligning an iris scale mark 54 inscribed on the iris scale ring with an iris indicator line 55.

A focusing mechanism of the lens apparatus will be described next with reference to FIGS. 1 to 3. The rear focus scale ring 3 is fastened to the front focus scale ring 2a by screwing a screw (second screw) 80a to a screw hole (second screw hole) 82 provided in the front focus scale ring 2a through a through hole 81 provided in the rear focus scale ring 3. Thus, the rear focus scale ring 3 rotates integrally with the front focus scale ring 2a.

The front focus scale ring 2a is fastened to a rotatable female screw ring (driving ring) 6 by a screw (first screw) 80b and rotates integrally with the female screw ring 6. The female screw ring 6 and a male screw ring 7 are screwed to each other to constitute a screw driving mechanism. The male screw ring 7 has fitting holes 12, in which skid members 8 fixed to a movable barrel 9 on which a movable lens unit 10 is fixedly mounted are fitted. The pairs of the skid member 8 and the fitting hole 12 are arranged at nearly equal circumferential intervals therebetween in a plane perpendicular to the optical axis direction of the lens (corresponding to the horizontal direction of FIG. 3). The skid members 8 are also fitted in three straight slots 13 of a fixed ring 4, which is fixed to the lens mount 42. Turning the front focus scale ring 2a or the rear focus scale ring 3 causes the female screw ring 6 to rotate. Since the rotation of the male screw ring 7 about the optical axis 70 is prevented by the three straight slots 13 in which the skid members 8 are fitted, the rotation of the female screw ring 6 leads to the shift of the male screw ring 7 along the direction of the optical axis 70 caused by the screw driving mechanism. As the male screw ring 7 shifts along the direction of the optical axis 70, the movable barrel 9 to which the skid members 8 are fixed and the movable lens unit 10 shift integrally with it, whereby focus adjustment of the lens body 1 can be achieved.

The front focus scale ring 2a and the rear focus scale ring 3 respectively have a front focus scale 50 (first scale mark portion) and a rear focus scale 51 (second scale mark portion) arranged along rotational direction about the optical axis. The photographer can focus the lens at a desired object distance by aligning a scale mark of the rear focus scale 51 with a rear focus indicator line 52 provided on a rear indicator ring 5. Similarly, the photographer can focus the lens at a desired object distance by aligning a scale mark of the front focus scale 50 with a front focus indicator line provided on the fixed ring 4 at a position on the side of the fixed ring 4 opposite to the side shown in the projection view of FIG. 1. When shooting, the photographer can selectively read one of the front focus scale 50 and the rear focus scale 51. In cases where there are a plurality of photographers, one photographer may read one of the focus scales (e.g. the front focus scale 50), and another photographer may read the other scale (e.g. the rear focus scale 51). With the provision of the front focus scale 50 and the rear focus scale 51 arranged along the rotational direction about the optical axis respectively on the front focus scale ring 2a and the rear focus scale ring 3, the lens apparatus can provide high flexibility in scale reading.

Position adjustment of the focus scale rings will be described next.

The lens body 1 does not have a flange back adjusting mechanism allowing adjustment of the position (or flange back) of the lens unit relative to the image pickup element. Therefore, variations in the flange back due to manufacture errors of the lens body 1 and/or the camera can lead to differences between the distance information provided by the focus scale and the actual object distance. Then, it is necessary to adjust the position of the focus scale to match it with the actual object distance. When the position of the focus scale is adjusted, the screw 80a is loosened firstly, and the rear focus scale ring 3 is detached as shown in FIG. 2. The fastening position of the screw 80b fastening the front focus scale ring 2a and the female screw ring 6 can be adjusted in the range of the elongated hole 11 on the front focus scale ring 2a. The photographer fastens the screw 80b with the position of the front focus scale 50 and the front focus indicator line on the fixed ring 4 set to the actual object distance, whereby a correct correspondence between the front focus scale of the front focus scale ring 2a and the actual object distance can be obtained. Then, the rear focus scale ring 3 is fastened to the front focus scale ring 2a by the screw 80a, at the position at which the rear focus scale ring 3 was initially fixed. Thus, the elongated hole 11 used to adjust the position with respect to the rotational direction can be concealed. There is a gap (adjusting gap) between the edge of the through hole 81 in the rear focus scale ring 3 and the screw 80a. Because this gap allows positional adjustment with respect to the rotational direction, a positional difference between the scales on the front focus scale ring 2a and the rear focus scale ring 3 can be adjusted over the dimension of the clearance.

The smallest inner diameter of the front focus scale ring 2a and the rear focus scale ring 3 is larger than the largest outer diameter of the parts located on the mount side (i.e. the image side or the side opposite to (or away from) the first partial operating ring) of the rear focus scale ring 3. Therefore, if the screw 80b, which fastens the front focus scale ring 2a to the female screw ring 6, is removed, only the front focus scale ring 2a and the rear focus scale ring 3 can be detached from and attached to the lens apparatus without the other components disassembled. This allows easy replacement of the scale rings having the front focus scale 50 and the rear focus scale 51 with other scale rings having scales in different units, e.g. replacement of scale rings having scales in units of feet with scale rings having scales in units of meters, or vice versa.

As described above, in this embodiment, the front focus scale ring 2a can be fastened reliably by the screw 80b after its position is adjusted. Moreover, since the attachment of the rear focus scale ring 3 prevents the exposure of the elongated hole 11 used to adjust the scale position to the outside, the entrance of foreign matters such as dust into the elongated hole 11 can be prevented. Therefore, it is not necessary to provide an additional part for concealing the elongated hole.

Although the focus scale structure has been described in this embodiment, the present invention is not limited to this. In the case of a lens apparatus in which a zoom lens movable along the direction of the optical axis is driven by rotating a driving ring rotatable about the optical axis, the structure according to the present invention can also be applied to an operating ring having a scale mark portion and fixed to this driving ring. An object to be driven is not limited to an optical element that is movable along the direction of the optical axis. Even in the case of a lens apparatus having an optical element (such as an iris) that is driven by rotating a driving ring rotatable about the optical axis but is immovable in the direction of the optical axis, the structure according to the present invention can be applied to an operating ring having a scale mark portion and fixed to the driving ring, and similar advantageous effects can be achieved.

While an exemplary embodiment of the present invention has been described, the present invention is not limited to this embodiment. Various modification and changes can be made thereto without departing from the essence of the present invention.

(Second Embodiment)

Figure 4:
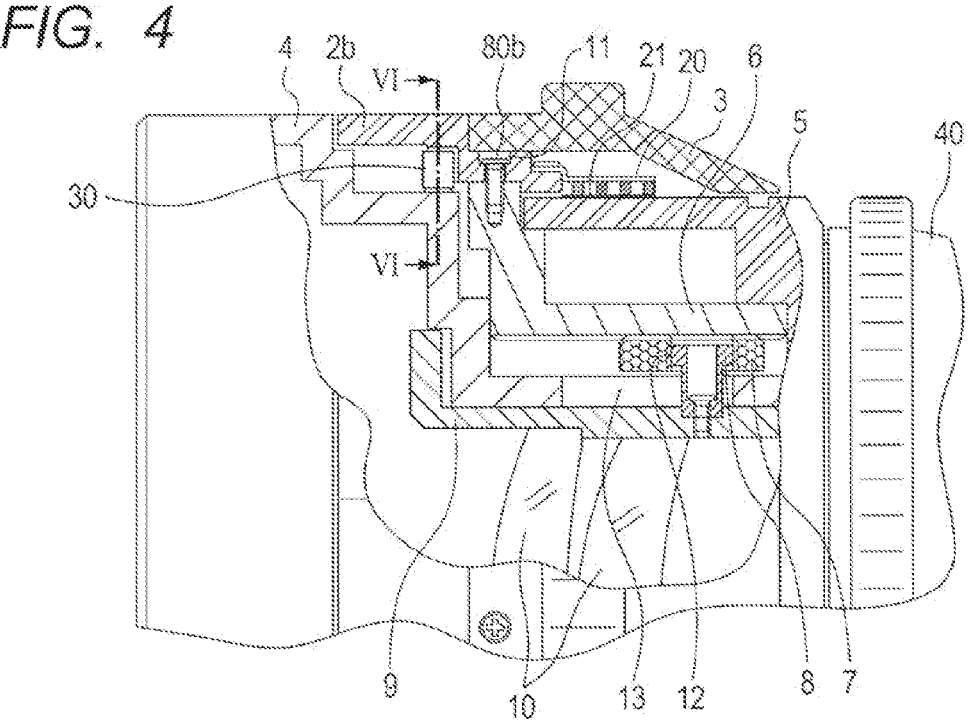
FIG. 4 is a partial cross sectional view of a lens apparatus according to a second embodiment of the present invention.
Figure 5:
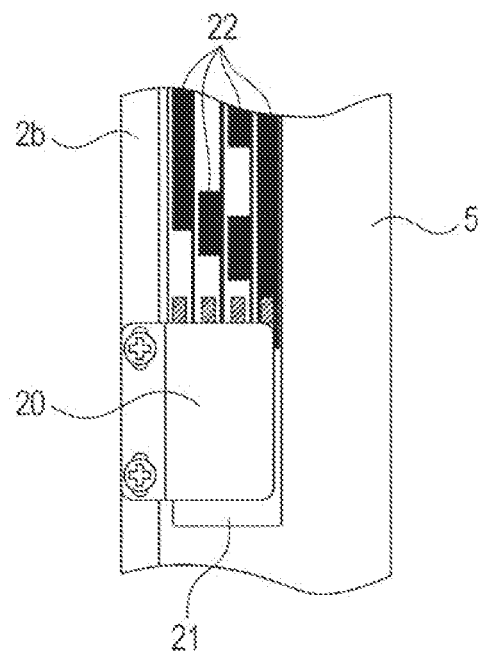
FIG. 5 shows a rotational position detection apparatus of the lens apparatus according to the second embodiment of the present invention.
Figure 6:
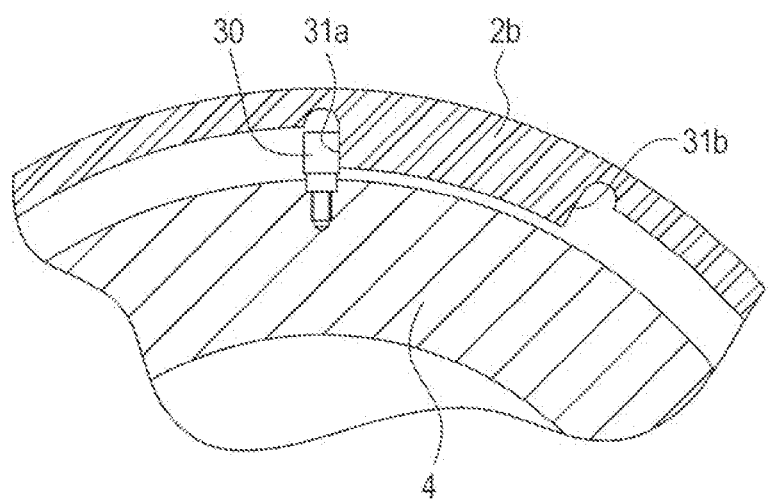
FIG. 6 is a cross sectional view taken on line VI-VI in FIG. 4, showing a rotation restriction part of the lens apparatus according to the second embodiment of the present invention.

FIG. 4 is a partial cross sectional view of a lens apparatus according to a second embodiment. FIG. 5 shows a rotational position detection apparatus in this embodiment. FIG. 6 is a cross sectional view taken on line VI-VI in FIG. 4, showing a rotation restriction part of the lens apparatus.

A focusing mechanism of the lens apparatus will be described with reference to FIGS. 4 to 6.

In this embodiment, the front focus scale ring 2a in the first embodiment has been replaced by a front focus scale ring 2b. A brush 20 can be attached to the front focus scale ring 2b. The focus scale ring 2b has a focus rotation ends 31a, 31b. Except for the above-described differences, the construction of the focus adjustment mechanism in this embodiment is the same as that in the first embodiment.

Now, the rotational position detection mechanism serving as a position detector for the focus scale ring will be described. As the front focus scale ring 2b or the rear focus scale ring 3 is turned by user's operation, the brush 20 fixed to the front focus scale ring 2b revolves integrally with it about the optical axis. The brush 20 has four terminals, as shown in FIGS. 4 and 5 for example, which are in sliding contact with a conductor pattern portion 22 of a patterned FPC 21 attached on the outer circumference of the rear indicator ring 5, which is a fixed part fixed in the lens apparatus. The patterned FPC 21 is connected with a control circuit board, which is not shown in the drawings. In the control circuit board, signal processing is performed based on the combination of contacts of the terminals of the brush 20 with the conductor pattern portion 22 of the patterned FPC 21 to detect the rotational position of the focus scale ring relative to the rear indicator ring 5, which is a fixed part fixed in the lens apparatus. The position at which the brush 20 is attached is adjusted in the range of the elongated holes provided in the brush 20 in such a way as to make the focus scale position and the detected rotational angular position coincide with each other, and then the brush 20 is fixed.

The rotation restriction part of the focus scale ring will be described next. The front focus scale ring 2b has the focus rotation ends (edge position restrictor) 31a, 31b. As the front focus scale ring 2b or the rear focus scale ring 3 is turned by user's operation, the focus rotation end 31a or 31b eventually abuts a stopper pin 30 fixedly planted on the fixed ring 4 (fixed part) fixed in the lens apparatus, thereby restricting the range of rotation of the front focus scale ring 2b and the rear focus scale ring 3 about the optical axis.

Next, adjustment of the rotational position of the focus scale ring about the optical axis will be described.

As with in the first embodiment, when the position of the focus scale is adjusted, the rear focus scale ring 3 is detached, and the screw 80b fixedly fastening the front focus scale ring 2b is loosened. Then, the position of the front focus scale ring 2b is adjusted in the range of the elongated hole 11. Since the brush 20 is fixed to the front focus scale ring 2b and revolves integrally with it, the position of the brush 20 changes integrally with the front focus scale ring 2b simultaneously with the adjustment of the position of the scale. Therefore, the positional relationship between the brush 20 and the patterned FPC 21 printed on the rear indicator ring 5, which was adjusted upon attachment of the brush 20 to the front focus scale ring 2b, can be maintained. Consequently, the relationship between the scale position and the detected rotational angle is maintained. Furthermore, the positional relationship between the focus rotation ends 31a, 31b and the front focus scale 50 is maintained through the adjustment of the position of the front focus scale ring 2b, because the focus rotation ends 31a, 31b and the front focus scale 50 are provided on the same component.

As described above, in this embodiment, the front focus scale ring 2b can be fastened stably by the screw 80b after the adjustment of the position of the front focus scale ring 2b with the positional relationships between the scale and the rotation detection position and between the scale and the focus rotation ends maintained unchanged. Therefore, it is not necessary to adjust these positional relationships again. Moreover, since the rear focus scale ring 3 is detachable, a rotation detection portion can be provided in a space inside of and close to the rear focus scale ring 3. This facilitates space saving. While the focus scale structure has been described in this embodiment, a similar structure can be applied to an operating ring having other types of scale such as zoom (focal length) scale or iris scale. While in this embodiment the rotational position is detected using a conductor pattern to which a bush is in contact, other types of position detection sensors such as sensors using an electric resistor or optical element may be used.

In the above-described embodiment, the screw 80b (first screw) is screwed into the screw hole (first screw hole) on the female screw ring 6 through the elongated hole 11, which is provided on the front focus scale ring and elongated in the rotational (or circumferential) direction about the optical axis, and the front focus scale ring is fastened to the female screw ring, which is a driving ring. However, the fixing mechanism (first fixing mechanism) for fixing the front focus scale ring to the driving ring, which is constituted in the embodiment by the elongated hole 11, the screw hole (first screw hole) provided on the female screw ring 6, and the screw (first screw) 80b, is not limited to the above-described structure. Another fixing mechanism may be adopted so long as it allows adjustment of the fixed position of the front focus scale ring relative to the female screw ring 6.

In the above-described embodiment, the rear focus scale ring (second partial operating ring) 3 is fastened to the front focus scale ring (first partial operating ring) 2a by screwing the screw (second screw) 80a to the screw hole (second screw hole) 82 provided on the front focus scale ring (first partial operating ring) 2a through the through hole 81 provided in the rear focus scale ring (second partial operating ring) 3. However, the fixing mechanism (second fixing mechanism) for fixing the rear focus scale ring (second partial operating ring) 3 to the front focus scale ring (first partial operating ring) 2a, which is constituted in the embodiment by the through hole 81, the screw hole (second screw hole) 82, and the screw (second screw) 80a, is not limited to the above-described structure. Another fixing mechanism may be adopted so long as it allows adjustment of the fixed position of the rear focus scale ring 3 relative to the screw hole (second screw hole) 82.

As will be apparent from FIGS. 1 and 2, the amount of adjustment allowed by the second fixing mechanism is smaller than the amount of adjustment allowed by the first fixing mechanism, namely the amount of adjustment allowed by the first fixing mechanism is larger than the amount of adjustment allowed by the second fixing mechanism. In other words, the through hole 81 is smaller than the elongated hole 11. In consequence, the through hole 81 is not exposed to the outside. Therefore, dust and foreign matters are prevented from entering the through hole 81, and the appearance of the lens apparatus is not deteriorated.

A lens apparatus according to the present invention as described above and a camera apparatus on which the lens apparatus can be detachably mounted can constitute an image pickup apparatus capable of enjoying advantages of the present invention.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2012-092311, filed Apr. 13, 2012, which is hereby incorporated by reference herein in its entirety.

What is claimed is:

1. A lens apparatus comprising:
a movable optical element;
a driving ring rotatable about an optical axis and configured to drive the optical element by its rotation; and
an operating ring coupled to the driving ring and configured to rotate about the optical axis integrally with the driving ring, and includes:
a first partial operating ring fixed to the driving ring with a first fixing mechanism that allows the fixing position of the first partial operating ring to be adjustable with respect to the driving ring in the rotational direction; and
a second partial operating ring fixed to the first partial operating ring and covering the first fixing mechanism, and
wherein the second partial operating ring is fixed to the first partial operating ring with a second fixing mechanism that allows the fixing position of the second partial operating ring to be adjustable with respect to the first partial operating ring in the rotational direction.

2. A lens apparatus according to claim 1 further comprising a first scale mark portion arranged along the rotational direction.

3. A lens apparatus according to claim 2, wherein the second partial operating ring has a second scale mark portion arranged along the rotational direction, and an adjustable amount allowed by the first fixing mechanism is larger than an adjustable amount allowed by the second fixing mechanism.

4. A lens apparatus according to claim 1, wherein:
the driving ring includes a screw hole,
the first partial operating ring includes an elongated hole elongated in the rotational direction,
the first fixing mechanism comprises the screw hole, the elongated hole, and a screw,
the first partial operating ring is fixed to the driving ring with the screw into the screw hole through the elongated hole.

5. A lens apparatus according to claim 1, wherein:
the second partial operating ring includes a through hole,
the first partial operating ring includes a screw hole,
the second fixing mechanism comprises the through hole, the screw hole, and a screw,
the second partial operating ring is fastened to the first partial operating ring with the screw into the screw hole through the through hole, with an adjusting gap between an edge of the through hole and the screw,
the adjusting gap allows a positional relationship between a second scale mark portion of the second partial operating ring and a first scale mark portion of the first partial operating ring with respect to the rotational direction to be adjustable.

6. A lens apparatus according to claim 1, wherein:
the smallest inner diameter of the first partial operating ring and the second partial operating ring is larger than the largest outer diameter of the portion of the lens apparatus that is located on the side opposite to the first partial operating ring with respect to the second partial operating ring, and
the first partial operating ring and the second partial operating ring is detachably attachable from the side opposite to the first partial operating ring.

7. A lens apparatus according to claim 1, wherein the first partial operating ring includes a position detector that detects a rotational angle of the first partial operating ring about the optical axis relative to a fixed part fixed to the lens apparatus.

8. A lens apparatus according to claim 7, wherein the position detector is located inside the second partial operating ring.

9. A lens apparatus according to claim 1, wherein the first partial operating ring has an edge position restrictor that restricts a range of rotation of the first partial operating ring relative to a fixed part fixed in the lens apparatus.

10. An image pickup apparatus comprising:
a lens apparatus; and
an image pickup apparatus configured to be detachably attachable to the lens apparatus,
wherein the lens apparatus comprises:
a movable optical element;
a driving ring rotatable about an optical axis and configured to drive the optical element by its rotation; and
an operating ring coupled to the driving ring and configured to rotate about the optical axis integrally with the driving ring, and includes:
a first partial operating ring fixed to the driving ring with a first fixing mechanism that allows the fixing position of the first partial operating ring to be adjustable with respect to the driving ring in the rotational direction; and
a second partial operating ring fixed to the first partial operating ring and covering the first fixing mechanism,
wherein the second partial operating ring is fixed to the first partial operating ring with a second fixing mechanism that allows the fixing position of the second partial operating ring to be adjustable with respect to the first partial operating ring the rotational direction.

* * * * *